(12) United States Patent
LaPray et al.

(10) Patent No.: US 10,752,759 B2
(45) Date of Patent: Aug. 25, 2020

(54) METHODS FOR FORMING BLENDED FILMS INCLUDING RENEWABLE CARBOHYDRATE-BASED POLYMERIC MATERIALS WITH HIGH BLOW UP RATIOS AND/OR NARROW DIE GAPS FOR INCREASED STRENGTH

(71) Applicant: BiologiQ, Inc., Idaho Falls, ID (US)

(72) Inventors: Bradford LaPray, Idaho Falls, ID (US); Donald R. Allen, Idaho Falls, ID (US)

(73) Assignee: BiologiQ, Inc., Idaho Falls, ID (US)

(*) Notice: Subject to any disclaimer, the term of this patent is extended or adjusted under 35 U.S.C. 154(b) by 0 days.

(21) Appl. No.: 16/456,303

(22) Filed: Jun. 28, 2019

(65) Prior Publication Data

US 2019/0315947 A1    Oct. 17, 2019

Related U.S. Application Data

(63) Continuation-in-part of application No. PCT/US2017/068492, filed on Dec. 27, 2017, which
(Continued)

(51) Int. Cl.
*C08L 23/06* (2006.01)
*C08J 5/18* (2006.01)
(Continued)

(52) U.S. Cl.
CPC .......... *C08L 23/06* (2013.01); *B29C 48/0018* (2019.02); *B29C 48/022* (2019.02);
(Continued)

(58) Field of Classification Search
USPC ..................... 264/209.4; 525/54.31
See application file for complete search history.

(56) References Cited

U.S. PATENT DOCUMENTS 3,270,874 A    9/1966   Hilton
3,865,603 A    2/1975   Szymanski
(Continued)

FOREIGN PATENT DOCUMENTS

CN    1603361      4/2005
CN    101589097    11/2009
(Continued)

OTHER PUBLICATIONS

Ahmed et al. Biodegradation of plastics: current scenario and future prospects, Mar. 2018.
(Continued)

*Primary Examiner* — Fred M Teskin
(74) *Attorney, Agent, or Firm* — Workman Nydegger

(57) ABSTRACT

Described herein are methods for increasing strength of blown films, by forming the films using a film blowing apparatus where the film is formed from a blend of a first polymeric material and a renewable carbohydrate-based polymeric material having particular characteristics. By using such a blend, and ensuring that the film blowing apparatus is operated at a high blow up ratio of at least 2.0, and/or using a narrow die gap of no more than 500 microns, Applicant has discovered that increased strength in the film can be obtained, as compared to where (i) the renewable carbohydrate-based polymeric material is not included or (ii) where the film is blown at lower blow up ratios and/or wider die gaps.

20 Claims, 5 Drawing Sheets

Related U.S. Application Data is a continuation-in-part of application No. 15/481,806, filed on Apr. 7, 2017, and a continuation-in-part of application No. 15/481,823, filed on Apr. 7, 2017, and a continuation-in-part of application No. 15/691,588, filed on Aug. 30, 2017, and a continuation-in-part of application No. 15/836,555, filed on Dec. 8, 2017, application No. 16/456,303, filed on Jun. 28, 2019, which is a continuation-in-part of application No. 15/691,588, filed on Aug. 30, 2017, which is a continuation-in-part of application No. 14/853,725, filed on Sep. 14, 2015, now abandoned, and a continuation-in-part of application No. 14/853,780, filed on Sep. 14, 2015, now abandoned, and a continuation-in-part of application No. 15/481,806, filed on Apr. 7, 2017, and a continuation-in-part of application No. 15/481,823, filed on Apr. 7, 2017.

(60) Provisional application No. 62/610,615, filed on Dec. 27, 2017, provisional application No. 62/610,618, filed on Dec. 27, 2017, provisional application No. 62/440,399, filed on Dec. 29, 2016, provisional application No. 62/442,432, filed on Jan. 4, 2017, provisional application No. 62/483,219, filed on Apr. 7, 2017, provisional application No. 62/187,231, filed on Jun. 30, 2015.

(51) Int. Cl.
*B29C 48/10* (2019.01)
*B29C 55/28* (2006.01)
*B29C 48/00* (2019.01)
*B29L 23/00* (2006.01)

(52) U.S. Cl.
CPC .............. *B29C 48/10* (2019.02); *C08J 5/18* (2013.01); *B29K 2023/06* (2013.01); *B29K 2995/005* (2013.01); *B29L 2023/001* (2013.01); *C08J 2323/06* (2013.01); *C08J 2403/02* (2013.01); *C08L 2203/16* (2013.01); *C08L 2205/08* (2013.01)

(56) References Cited

U.S. PATENT DOCUMENTS

| | | |
|---|---|---|
| 4,016,117 A | 4/1977 | Griffin |
| 5,026,745 A | 6/1991 | Weil |
| 5,095,054 A | 3/1992 | Lay et al. |
| 5,314,934 A | 5/1994 | Tomka |
| 5,449,708 A | 9/1995 | Schiltz |
| 5,462,983 A | 10/1995 | Bloembergen |
| 5,510,401 A | 4/1996 | Dehennau et al. |
| 5,714,445 A | 2/1998 | Trinh |
| 6,211,325 B1 | 4/2001 | Sun |
| 6,605,657 B1 | 8/2003 | Favis et al. |
| 6,783,854 B2 | 8/2004 | Bond |
| 6,818,295 B2 | 11/2004 | Bond et al. |
| 6,946,506 B2 | 9/2005 | Bond et al. |
| 7,608,649 B2 | 10/2009 | Sun |
| 7,666,261 B2 | 2/2010 | Bailey et al. |
| 7,740,952 B2 | 6/2010 | Hausmann |
| 7,998,888 B2 | 8/2011 | Shi |
| 8,188,185 B2 | 5/2012 | Wang |
| 8,283,006 B2 | 10/2012 | Wang |
| 8,329,601 B2 | 12/2012 | Shi |
| 8,466,337 B2 | 6/2013 | Wang |
| 8,802,754 B2 | 8/2014 | Nie |
| 8,889,945 B2 | 11/2014 | Wang |
| 8,927,617 B2 | 1/2015 | Funk |
| 9,056,968 B2 | 6/2015 | Matsuo et al. |
| 9,327,438 B2 | 5/2016 | Wang |
| 9,464,188 B2 | 10/2016 | Wang |
| 9,884,471 B2 | 2/2018 | Neuman et al. |
| 10,131,783 B2 | 11/2018 | Schmidt et al. |
| 10,214,634 B2 | 2/2019 | LaPray |
| 10,239,292 B2 | 3/2019 | Nissenbaum et al. |
| 2002/0006989 A1* | 1/2002 | Bastioli .............. C08J 5/18 524/47 |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2008/0103232 A1 | 5/2008 | Lake |
| 2008/0287592 A1 | 11/2008 | Favis |
| 2009/0048368 A1 | 2/2009 | Bash |
| 2010/0159777 A1 | 6/2010 | Wang |
| 2010/0311874 A1* | 12/2010 | Mentink ............ C08G 18/3206 524/48 |
| 2011/0287929 A1 | 11/2011 | Smith |
| 2012/0059097 A1 | 3/2012 | Liao |
| 2012/0139154 A1 | 6/2012 | Huneault |
| 2012/0283364 A1 | 11/2012 | Sarazin et al. |
| 2012/0316257 A1* | 12/2012 | Bastioli .............. C08L 1/02 521/182 |
| 2013/0157031 A1 | 6/2013 | Wang |
| 2013/0157032 A1 | 6/2013 | Wang |
| 2014/0011921 A1 | 1/2014 | Bash |
| 2014/0079935 A1 | 3/2014 | Broyles |
| 2014/0272370 A1 | 9/2014 | Broyles |
| 2016/0107426 A1* | 4/2016 | Leufgens ............ C08L 23/06 428/35.2 |
| 2017/0210889 A1 | 7/2017 | LaPray |
| 2017/0218184 A1 | 8/2017 | LaPray |
| 2017/0283597 A1 | 10/2017 | LaPray et al. |
| 2017/0362418 A1 | 12/2017 | LaPray |
| 2018/0100060 A1 | 4/2018 | LaPray |
| 2019/0194426 A1 | 2/2019 | LaPray |
| 2019/0256681 A1 | 8/2019 | LaPray |
| 2019/0276664 A1 | 9/2019 | LaPray |
| 2019/0315942 A1 | 10/2019 | LaPray |
| 2019/0315947 A1 | 10/2019 | LaPray |

FOREIGN PATENT DOCUMENTS

| | | |
|---|---|---|
| CN | 101805499 | 5/2012 |
| CN | 102850626 | 1/2013 |
| CN | 103289165 | 9/2013 |
| CN | 103987504 | 8/2014 |
| CN | 103998195 | 8/2014 |
| CN | 105966014 | 9/2016 |
| CN | 103627153 | 2/2018 |
| CN | 105670239 | 6/2018 |
| CN | 108276744 | 7/2018 |
| EP | 326517 | 7/1994 |
| EP | 2762307 | 8/2014 |
| GB | 2272699 | 5/1994 |
| JP | S49055740 | 5/1974 |
| JP | S50086543 | 7/1975 |
| JP | H07126449 | 5/1995 |
| JP | H07258488 | 10/1995 |
| JP | H09041224 | 2/1997 |
| JP | H11322962 | 11/1999 |
| JP | 2003518541 | 6/2003 |
| JP | 3539955 | 7/2004 |
| JP | 2005089718 | 4/2005 |
| JP | 2005264111 | 9/2005 |
| JP | 2010150305 | 7/2010 |
| JP | 2010260923 | 11/2010 |
| JP | 2011042032 | 3/2011 |
| JP | 2011511121 | 4/2011 |
| JP | 2011213836 | 10/2011 |
| JP | 2012148507 | 8/2012 |
| JP | 5544303 | 7/2014 |
| JP | 2018502744 | 2/2018 |
| JP | 2018525467 | 9/2018 |
| WO | 2001048078 | 7/2001 |
| WO | 2003014164 | 11/2004 |
| WO | 2006116861 | 11/2006 |
| WO | 2009073197 | 6/2009 |
| WO | 2009103052 | 8/2009 |

(56) References Cited

FOREIGN PATENT DOCUMENTS

| WO | 2011020170 | 2/2011 |
|---|---|---|
| WO | 2012088585 | 7/2012 |
| WO | 2013116945 | 8/2013 |
| WO | 2014089321 | 6/2014 |
| WO | 2014190395 | 12/2014 |
| WO | 2015028943 | 3/2015 |
| WO | 2016109196 | 7/2016 |
| WO | 2018187784 | 10/2018 |

OTHER PUBLICATIONS

"APR Position Statement—Degradable Additives Use in Bottles, Forms and Films" The Association of Postconsumer Plastic Recyclers, http://plasticsrecycling.org/about/position-statements, Apr. 27, 2015, 1 page.

Arevalo-Nino et al., "Starch-based extruded plastic films and evaluation of their biodegradable properties" Biodegradation 7: 231-237, 1996.

"Background on Biodegradable Additives" BPI, Feb. 12, 2010.

Bastioli et al. "Starch in Polymers Technology" ACS Symposium Series, Jan. 1, 2012, American Chemical Society/Oxford University Press, XP055490447, vol. 1114, pp. 87-112.

"BPI Position on Degradable Additives" Feb. 2010, 6 pages.

Braskem "Life Cycle Assessment of Green Plastic" Available as early as Mar. 28, 2017, accessed at http://www.braskem.com_site.aspx_plastic-green, 18 pages.

Cardia Bioplastics FAQ [online] [site accessed Oct. 23, 2018] URL: http://www.cardiabioplastics.com/our-business/faq.

"Case Study: Compostable vs Oxo Degradable" Natur Bag, Feb. 19, 2019.

Chen et al. "Environmental Degradation of Starch/Poly (Lactic Acid) Composite in Seawater" Apr. 6, 2010.

"Compostable Plastics 101: An Overview of Compostable Plastics Sponsored by the California Organics Recycling Council" based on information and belief, available at least as early as 2012, 23 pages.

De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.

"Discover Polysaccharides" Available at http://polysac3db.cermav.cnrs.fr/discover_starch.html; Accessed Feb. 16, 2017, 10 pages.

"Environmentally Degradable Plastics" Leonardo Da Vinci Program; Jan. 2000-Dec. 2006.

Esmaeili, Atefeh, et al. "Biodegradation of Low-Density Polyethylene (LDPE) by Mixed Culture of Lysinibacillus xylanilyticus and Aspergillus niger in Soil." PLoS One 8(9): e71720, Sep. 23, 2013. https://doi.org/10.1371/journal.pone.0071720. Accessed Apr. 16, 2018.

Eyheraguibel, et al. "Characterization of oxidized oligomers from polyethylene films by mass spectrometry and NMR spectroscopy before and after biodegradation by a *Rhodococcus rhodochrous* strain" Chemosphere 184, 2017, pp. 366-374.

"French Proposal for Law on Biodegradable Plastics" Oxo-Biodegradable Plastics Association, Revised Oct. 31, 2013.

Fujisawa, et al. "Degradation of Polyethylene and Nylon 66 by the Laccase-Mediator System" Journal of Polymers and the Environment, vol. 9, Issue 3, 2001, pp. 103-108.

Gupta, Apeksha et al. "Visible Range Photocatalysts for Solid Phase Photocatalytic Degradation of Polyethylene and Polyvinyl Chloride." *Journal of the Chilean Chemical Society*, [S.I.], v. 62, n. 1, Jun. 2017. ISSN 0717-9707. <https://jcchems.com/index.php/JCCHEMS/article/view/156>. Accessed: Apr. 20, 2018.

Huagong et al., "Green Manufacturing Process of Fine Chemical Industry", 2006, Guangdong Science & Technology Press (National Outstanding Press).

Ibbrucker, Constance "Can Additives make plastics biodegradable?" Bioplastics Magazine Jan. 2017, 1 page.

Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.

International Search Report and Written Opinion for PCT/US2017/068492 dated Mar. 16, 2018, pp. 14.

Kalambur, et al., "An Overview of Starch-Based Plastic Blends from Reactive Extrusion" Journal of Plastic Film and Sheeting, 2006, vol. 22, pp. 39-58.

Li, Gang, et al., "Biodegradation of Thermoplastic Starch and its Blends with Poly(lactic acid) and Polyethylene: Influence of Morphology" published in *Macromolecular Journals of Chemistry and Physics*, 2011 pp. 1147-1154.

Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.

Nayak, "Biodegradable PBAT/Starch Nanocomposites", Nov. 24, 2010, Polymer-Plastics Technology and Engineering, 49:14, pp. 1406-1418, accessed on Feb. 24, 2013.

Ohtake, et al. "The Biodegradability of Polyethylene" Material Life, vol. 6, Issue 3, 1994, pp. 125-133.

Ojeda, Telmo, et al., "Polymer Degradation and Stability" Available as early as Dec. 16, 2010 at www.elsevier.com/locat/polydegstab, 5 pages.

Oluz, Zehra and Teoman Tinçer. "Additives for ultraviolet-induced oxidative degradation of low-density polyethylene." *J. Appl. Polym. Sci.*, 133, 43354, Jan. 18, 2016. *Wiley Online Library*, DOI: 10.1002/app.43354. Accessed Apr. 21, 2018.

"'Oxo-Biodegradable' Plastics and Other Plastics with Additives for Degradation" European Bioplastics BackGround Oct. 2015, 5 pages.

PCT International Search Report and Written Opinion for PCT/US2018/026610 dated Jul. 13, 2018.

PCT Search Report dated Sep. 14, 2016 for PCT/US2016/040092, 1 page.

PCT Search Report dated Sep. 15, 2016 for PCT/US2016/040104, 1 page.

Pearce "Biodegradable plastic bags carry more ecological harm than good" The Guardian, Jun. 18, 2009.

"Position Paper on Degradable Additives" SPI Bioplastics Division, issued Feb. 2016.

Ren et al., "Preparation, characterization and properties of binary and ternary blends with thermoplastic starch, poly(lactic acid) and poly(butylene adipate-co-terephthalate)", 2009, Carbohydrate Polymers, vol. 77, pp. 576-582.

"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.

Santos, R. A. L. et al. "Starch/Poly 9 Butylene Adipate—Co Terephthlalate/Montmorillonite Films Produced by Blow Extrusion" , 2014.

Schwach et al., "Starch-based biodegradable blends: morphology and interface properties", 2004, Polymer International, vol. 53, pp. 2115-2124, DOI: 10.1002/pi.1636.

Shang, Jing, et al. "Photocatalytic Degradation of Polystyrene Plastic under Fluorescent Light." *Environmental Science & Technology*, Sep. 5, 2003, 37 (19), pp. 4494-4499. *American Chemical Society*, DOI: 10.1021/es0209464. Accessed Apr. 20, 2018.

Shirai et al., "Thermoplastic starch/polyester films: Effects of extrusion process and poly (lactic acid) addition", 2013, Materials Science and Engineering C, vol. 33, pp. 4112-4117.

Shogren et al. "Biodegradation of starch/polylactic acid/poly(hydroxyester-ether) composite bars in soil" Polymer Degradation and Stability 79 (2003) 405-411.

Sumathi, Tirupati et al. "Production of Laccase by *Cochliobolus* sp. Isolated from Plastic Dumped Soils and Their Ability to Degrade Low Molecular Weight PVC." *Biochemistry Research International* 2016 (2016): 9519527. *PMC*. Web. Apr. 16, 2018.

Tang, et al., "Recent Advances in Starch, Polyvinyl Alcohol Based Polymer Blends, Nanocomposites and their Biodegradability" Carbohydrate Polymers, 2011, vol. 85, pp. 7-16.

(56) References Cited

OTHER PUBLICATIONS

Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.

Thakore, I.M., et al., "Studies on Biodegradability, morphology and thermo-mechanical properties of LDPE/modified starch blends" published in *The European Polymer Journal*, vol. 37 2001, pp. 151-160.

"The Flexible Packaging Association Position on Degradable Additives" FPA, Jun. 21, 2010.

"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retreived on Sep. 19, 2017, 5 pages.

Thryft, Ann R. "Biodegradable Plastics Standard to Bust Landfill Waste." ENSO Plastics, Nov. 15, 2011. http://ensoplastics.com/theblog/?p=535. Accessed Apr. 23, 2018.

Tokiwa, et al., "Biodegradability of Plastics" in the *International Journal of Molecular Sciences*, Aug. 26, 2009, vol. 10, pp. 3722-3742.

"Transition Metal Salts." Oxo-biodegradable Plastics Association, http://www.biodeg.org/index.html. Accessed Apr. 20, 2018.

Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.

Van Soest et al. "Crystallinity in Starch Plastics: Consequences for Material Properties" Trends in Biotechnology, vol. 15, No. 6, Jun. 1, 1997, pp. 208-213.

Vargha, et al., "Behavior of Polyethylene Films in Soil" published in *Periodica Polytechnica Chemical Engineering*, Nov. 5, 2015 pp. 60-68.

"What are Oxo-biodegradable Additives" MJS Packaging, May 8, 2014.

Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.

Yoshida, et al., "A Bacterium that Degrades and Assimilates Poly(ehylene terphthalate)" Science Magazine vol. 351 Issue 6278 Mar. 11, 2016 pp. 1196-1199.

Zhang, et al. "Retrogradation and Antiplasticization of Thermoplastic Starch" Mar. 2012.

U.S. Appl. No. 14/853,725, Apr. 28, 2017, Office Action.
U.S. Appl. No. 14/853,725, Nov. 8, 2017, Final Office Action.
U.S. Appl. No. 14/853,725, Oct. 12, 2018, Office Action.
U.S. Appl. No. 14/853,780, Oct. 12, 2016, Office Action.
U.S. Appl. No. 14/853,780, May 24, 2017, Final Office Action.
U.S. Appl. No. 14/853,780, Nov. 6, 2017, Office Action.
U.S. Appl. No. 14/853,780, Aug. 10, 2018, Office Action.
U.S. Appl. No. 14/853,780, Feb. 28, 2019, Office Action.
U.S. Appl. No. 15/481,806, Apr. 30, 2018, Office Action.
U.S. Appl. No. 15/481,806, Oct. 12, 2018, Office Action.
U.S. Appl. No. 15/481,806, Feb. 28, 2019, Office Action.
U.S. Appl. No. 15/481,806, Nov. 6, 2019, Final Office Action.
U.S. Appl. No. 15/481,823, Apr. 30, 2018, Office Action.
U.S. Appl. No. 15/481,823, Oct. 12, 2018, Final Office Action.
U.S. Appl. No. 15/481,823, Feb. 28, 2019, Office Action.
U.S. Appl. No. 15/481,823, Jul. 12, 2019, Final Office Action.
U.S. Appl. No. 15/481,823, Dec. 9, 2019, Office Action.
U.S. Appl. No. 15/628,379, Apr. 30, 2018, Office Action.
U.S. Appl. No. 15/628,379, Oct. 3, 2018, Notice of Allowance.
U.S. Appl. No. 15/691,588, Apr. 30, 2018, Office Action.
U.S. Appl. No. 15/691,588, Jan. 2, 2019, Office Action.
U.S. Appl. No. 15/691,588, May 10, 2019, Office Action.
U.S. Appl. No. 15/691,588, Dec. 9, 2019, Final Office Action.
U.S. Appl. No. 15/836,555, Aug. 12, 2019, Office Action.
U.S. Appl. No. 15/836,555, Feb. 7, 2020, Final Office Action.
U.S. Appl. No. 16/456,303, Apr. 9, 2020, Office Action.

\* cited by examiner

METHODS FOR FORMING BLENDED FILMS INCLUDING RENEWABLE CARBOHYDRATE-BASED POLYMERIC MATERIALS WITH HIGH BLOW UP RATIOS AND/OR NARROW DIE GAPS FOR INCREASED STRENGTH

CROSS-REFERENCE TO RELATED APPLICATION

This application is a continuation in part of PCT Application No. PCT/US2017/068492 filed Dec. 27, 2017, which claims the benefit of U.S. application Ser. No. 15/481,806 (21132.1) filed Apr. 7, 2017; U.S. application Ser. No. 15/481,823 (21132.2) filed Apr. 7, 2017; U.S. application Ser. No. 15/691,588 (21132.7) filed on Aug. 30, 2017; U.S. application Ser. No. 15/836,555 (21132.4.1) filed on Dec. 8, 2017; U.S. Application No. 62/610,615 (21132.9) filed on Dec. 27, 2017; U.S. Application No. 62/610,618 (21132.12) filed on Dec. 27, 2017; U.S. Application No. 62/440,399 (21132.10) filed on Dec. 29, 2016; U.S. Application No. 62/442,432 (21132.11) filed on Jan. 4, 2017; and U.S. Application No. 62/483,219 (21132.4), filed Apr. 7, 2017. The entire contents of each of the foregoing is incorporated by reference herein.

This application is also a continuation in part of U.S. application Ser. No. 15/691,588 (21132.7) filed on Aug. 30, 2017 which is a continuation in part of U.S. application Ser. No. 14/853,725 (21132.8) filed on Sep. 14, 2015 which claims the benefit of U.S. Provisional Patent Application No. 62/187,231 filed on Jun. 30, 2015. U.S. application Ser. No. 15/691,588 (21132.7) is also a continuation in part of U.S. application Ser. No. 14/853,780 (21132.6) filed on Sep. 14, 2015, and a continuation in part of U.S. application Ser. No. 15/481,806 (21132.1) and Ser. No. 15/481,823 (21132.2), both filed on Apr. 7, 2017. U.S. application Ser. No. 15/691,588 (21132.7) also claims the benefit of U.S. Provisional Patent Application No. 62/440,399 (21132.10) filed on Dec. 29, 2016, and U.S. Provisional Patent Application No. 62/442,432 (21132.11) filed on Jan. 4, 2017. The entire contents of each of the foregoing is incorporated by reference herein.

U.S. Provisional Patent Application No. 62/483,109 (21132.5), filed Apr. 7, 2017 is also incorporated by reference herein, in its entirety.

BACKGROUND

Traditional petrochemical-based plastics are formulated to be strong, lightweight, and durable. However, these plastics are typically not biodegradable, and as a result, hundreds of millions of tons of plastic sits in landfills or floats in the ocean.

Petrochemical-based plastic materials, such as large quantities of polyethylene and polypropylene, as well as numerous other plastics (polyethylene terephthalate, polyester, polystyrene, ABS, polyvinyl chloride, polycarbonate, nylon, and the like) are typically not readily biodegradable, nor are such materials typically sourced from renewable sources.

Recently efforts have been made to reduce the use of such non-renewable petrochemical-based plastic materials. Some such efforts have attempted to source resins for producing plastic materials from renewable sources, such as from sugarcane or other plant products. While available to some degree, such renewable sourced plastics have been far more expensive to produce than their petrochemical-based non-renewable counterparts.

In addition, plastic materials have particular strength characteristics associated therewith, dependent on the particular material(s) employed in forming the plastic film or other material, and physical characteristics of the film or other article itself. For example, when forming a plastic film, use of the non-renewable petrochemical-based plastic resin material can be reduced by forming a thinner film, but such reductions in material use result in a weaker film.

By way of example, while WO 2014/0190395 to Leufgens describes formation of films from a blend of polyethylene and a thermoplastic starch (particularly Cardia BL-F), such films are weaker than comparable films formed from the polyethylene alone, and because of the difficulties in processing blends including conventional thermoplastic starches, the films produced therein are of necessity very thick (e.g., 3 mils). Such very thick films may not result in any actual reduction in the use of the petrochemical based plastic resin material, because thin film formation is impossible as a practical matter, and/or because the inclusion of such thermoplastic starches weakens the overall film, so that a thick film is needed to maintain a desired level of strength.

It would be advantageous to provide films and associated methods of manufacture that might increase strength for any given film thickness, e.g., by adjusting the manufacturing parameters employed during manufacture, when using a renewable sourced plastic material. Such methods would allow a film to be produced at a given thickness with increased strength, or to produce the film at a lower thickness, but with the same strength. Such methods at the same time would result in actual reductions in the quantity of petrochemical plastic material employed, as a portion thereof is substituted with a renewable sourced plastic material, and the overall thickness does not need to be increased.

SUMMARY

This disclosure is directed to methods for providing increased strength to blown plastic films, while at the same time using renewable resin materials in such films. In particular, Applicant has discovered that while the strength of most plastic films blown from various resin materials (e.g., such as polyethylene and/or polypropylene) are not typically affected to any significant degree by changes in blow-up ratio, that when a renewable carbohydrate-based (e.g., starch-based) polymeric material having particular amorphous characteristics, particular glass transition temperature characteristics, and/or particular elastic modulus characteristics is included in the resin blend from which the film is blown, that strength does become dependent on blow-up ratio and/or die gap, and that it is also possible to blow films of narrow gauge. Blow-up ratio refers to the maximum diameter of the blown film divided by the diameter of the die of the film blowing apparatus. Typically, there is some increase in diameter as the molten resin material exits from the die, and begins to travel upwards, through the "frost line" towards the portion of the blown film bubble where the resin material is no longer molten, but has solidified. Solidification and crystallization typically occurs at the frost line, which is the location where opacity or a "frosty appearance" begins to be visible in the blown bubble film. Applicant has observed that when using such particular renewable carbohydrate-based polymeric materials, an increase in strength is obtainable, beyond the strength achieved when blowing an otherwise similar plastic film (but without the renewable polymeric material). Such increase is achieved by selecting a high blow up ratio and/or a narrow die gap. Such are believed to result in alignment, orientation, and/or stretching of the molecular structures of the renewable polymeric material, which is homogeneously distributed throughout the resin blend from which the film is formed. Such alignment and orientation of the amorphous renewable carbohydrate-based polymeric material within the film is believed to be at least partially responsible for the observed increase in strength.

In other words, as described herein, the particular renewable carbohydrate-based polymeric materials may be used in conjunction with the particular described processing conditions to enhance the strength of a given film, not to mention the sustainability benefits associated with replacing a portion of the other polymeric content of the film with the renewable polymeric material.

In particular, typical existing films are blown at a blow up ratio of about 1.5. Applicant has discovered that by increasing the blow up ratio to at least 2.0, e.g., from 2.2 to 2.8 (e.g., about 2.5), when a renewable carbohydrate-based polymeric material such as NuPlastiQ, available from Applicant, is included within the resin blend from which the film is formed, that there is a significant increase in film strength at the higher blow-up ratios. For example, a blend of NuPlastiQ and a typical polymeric resin (e.g., polyethylene and/or polypropylene) may exhibit strength characteristics at a blow-up ratio of 1.5 that are substantially the same as the strength of a film that is otherwise identical, but does not include the NuPlastiQ.

Such a film (without NuPlastiQ) does not exhibit any significant increase in strength when the blow-up ratio is increased, and therefore there is no reason to manipulate this value when blowing such films. Applicant has discovered that when including NuPlastiQ within the resin blend, the strength is significantly increased when using a high blow up ratio (e.g., at least 2.0), as noted above.

Furthermore, NuPlastiQ does not suffer from many of the problems of alternative thermoplastic starch materials, which inhibit their ability to be used in formation of relatively thin films (e.g., 2 mils or less, typically 1.5 mils or less, such as 0.1 mil to 1.5 mils). Such combination of discoveries has allowed Applicant to form films of a given thickness, exhibiting increased strength as compared to films formed of the same material, but without the NuPlastiQ or any included compatibilizer—i.e., formed from the other polymeric material, alone, such as polyethylene alone. Such discovery also allows production of films of the same strength, but with decreased thickness, when using NuPlastiQ in the blend. Such results are surprising and advantageous, allowing production of films that include a significant fraction of a renewable resin, while at the same time increasing strength. Such is achieved by manipulating the blow up ratio and/or die gap. Applicants have also discovered that increased strength is also possible by ensuring that the die gap employed in the film blowing apparatus is relatively narrow. Again, narrow die gaps are not possible as a practical matter with many conventional thermoplastic starch blends, as evidenced by Leufgens (where the die gap used was 1.6 to 1.8 mm). The present invention may employ die gaps of 1000 microns or less, more typically 500 microns or less. Thus blow up ratio and/or die gap can be used according to the present methods to provide for increased film strength.

By way of example, one embodiment may be directed to a method for providing increased strength to a blown plastic film, the method comprising blowing a plastic film using a film blowing apparatus, the film being blown from a blend including a first polymeric material (e.g., polyethylene, another polyolefin, or other conventional polymeric material) and a renewable carbohydrate-based polymeric material. The renewable carbohydrate-based polymeric material may be substantially amorphous, having a crystallinity of no more than 20%, it may have a Young's modulus of at least 1.0 GPa, and/or it may have a glass transition temperature of 70° C. to 100° C. The film blowing apparatus may operate at a high blow up ratio and/or narrow die gap, e.g., a blow up ratio of at least 2.0 when blowing the plastic film, or the die gap may be no more than 500 microns. The high blow-up ratio and/or narrow die gap may provide the blown plastic film with increased strength (e.g., as compared to all else being equal, but at a lower blow up ratio and/or larger die gap).

Another embodiment may be directed to a method for increasing a strength of a blown plastic film by manipulating the blow up ratio, the method comprising blowing a plastic film using a film blowing apparatus, the film being blown from a blend including a first polymeric material and a second polymeric material that comprises a renewable carbohydrate-based polymeric material. The renewable carbohydrate-based polymeric material may be substantially amorphous, having a crystallinity of no more than 20%, have a Young's modulus of at least 1 GPa, and have a glass transition temperature of 70° C. to 100° C. The method may further include manipulating (i.e., specifically selecting) a blow up ratio of the film blowing apparatus so as to select a high blow up ratio of at least 2.0, so as to increase the strength of the film (e.g., as compared to all else being equal, but at a lower blow up ratio).

Another embodiment may be directed to a method for increasing a strength of a blown plastic film by manipulating blow up ratio and die gap, the method comprising blowing a plastic film using a film blowing apparatus, the film being blown from a blend including a first polymeric material and a second polymeric material that comprises a renewable carbohydrate-based polymeric material. The renewable carbohydrate-based polymeric material may be substantially amorphous, having a crystallinity of no more than 20%, have a Young's modulus of at least 1 GPa, and/or having a glass transition temperature of 70° C. to 100° C. The method may further include manipulating (i.e., specifically selecting) a die gap of the film blowing apparatus so as to select a narrow die gap of no more than 500 microns, and manipulating the blow-up ratio to be at least 2.0, such that the narrow die gap and/or high blow up ratio increase the strength of the film (e.g., as compared to all else being equal, but at a higher die gap and/or lower blow up ratio).

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

I. Definitions

Figure 1:
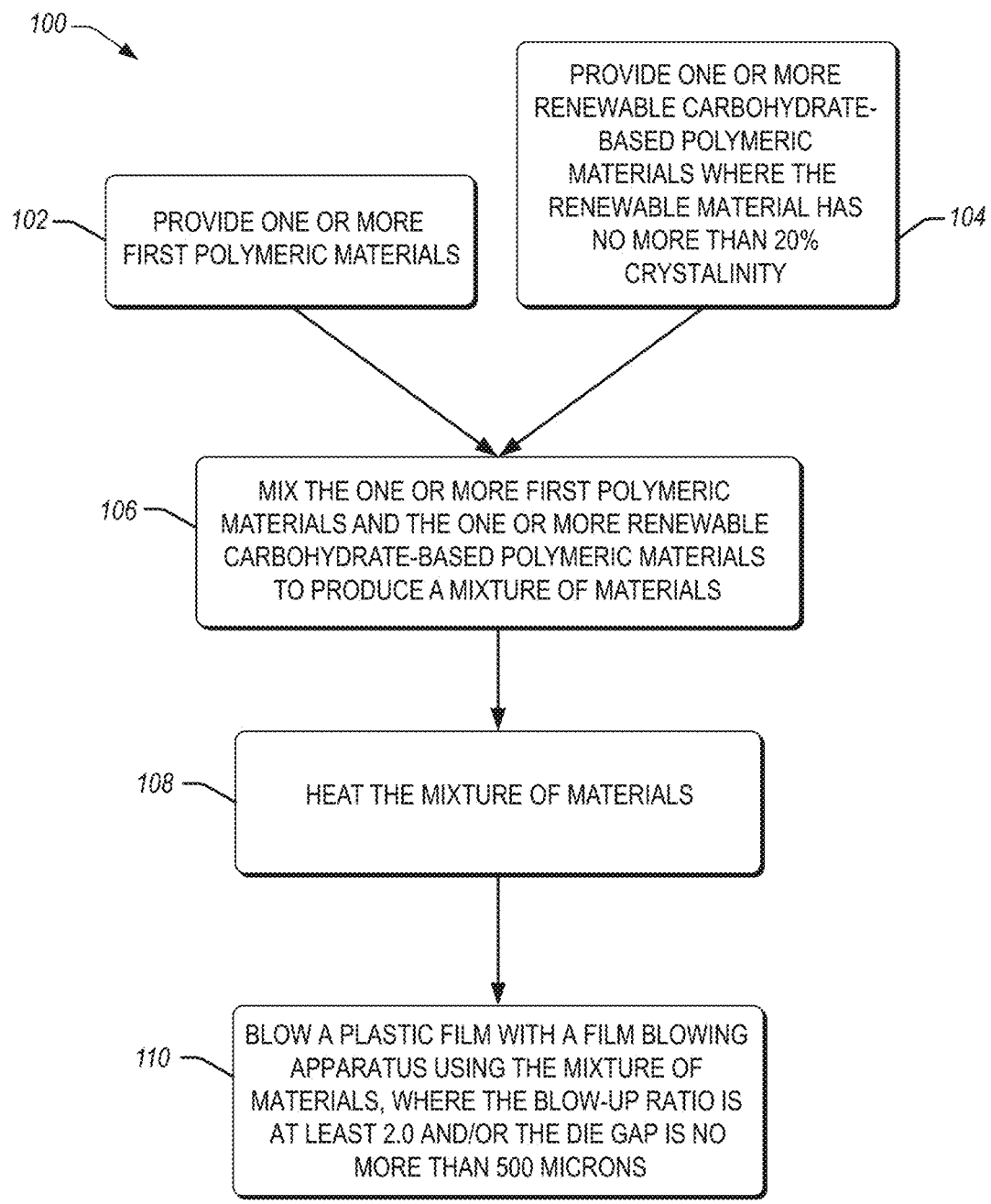
FIG. 1 illustrates a flow diagram of an example process for increasing the strength of a blown plastic film by manipulating the blow-up ratio.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

II. Introduction

The present disclosure is directed to, among other things, methods for providing increased strength to a blown plastic film. Such methods may include blowing a plastic film with a film blowing apparatus, the film being blown from a blend including a polymeric material (e.g., polyethylene or the like) and a renewable carbohydrate-based (e.g., starch-based) polymeric material, wherein the renewable carbohydrate-based polymeric material is substantially amorphous, e.g., having a crystallinity of no more than 20%. The renewable polymeric material may have a Young's modulus of at least 1.0 GPa, and/or it may have a glass transition temperature of 70° C. to 100° C. The film blowing apparatus is specifically operated at a high blow up ratio of at least 2.0 when blowing the plastic film, and/or with a narrow die gap (e.g., no more than 500 microns). Such characteristics, when using the renewable carbohydrate-based polymeric material have been found by Applicant to surprisingly provide increased strength to the plastic film, as compared to the strength that would be provided at a lower, more typical blow up ratio (e.g., 1.5) or wider die gap. Such comparison showing increased strength may be with the same material, while just altering either blow up ratio or die gap. Such increased strength may also be exhibited as compared to the strength that would be provided when blowing the film using the first polymeric material (e.g., polyethylene) alone, without the ESR or other renewable carbohydrate-based polymeric material. When blowing PE alone, blow up ratio and die gap do not significantly affect strength.

Such methods may include a step of specifically selecting the high blow up ratio and/or narrow die gap in order to provide increased strength to the resulting blown film, as opposed to any other purpose for which one might conceivably manipulate the blow up ratio (e.g., to perhaps manipulate the lay flat width of the resulting film).

For example, Applicant has discovered that when blowing film from the first polymeric material, such as polyethylene, alone, there is no significant effect on strength as the blow up ratio is manipulated. Furthermore, Applicant discovered that when adding a renewable carbohydrate-based polymeric material such as NuPlastiQ to the blend from which the film is blown, there is no significant decrease in strength for such a blended film, as compared to the 100% polyethylene or other polymeric material film, when blown at the same typical 1.5 blow up ratio typically employed in blowing films. Applicant has though further discovered that increases in strength can actually be achieved when blowing a blended film including a renewable carbohydrate-based polymeric material such as NuPlastiQ by increasing the blow up ratio, e.g., to at least 2.0, preferably from 2.2. to 2.8 (e.g., 2.5).

While it is not completely understood why strength increases at the higher blow up ratios, where no such affect over strength occurs with films formed from the first polymeric material alone, it is believed that there may be some type of alignment orientation, stretching, or ordered arrangement of the amorphous or other structures of the molecules of the blend when the blow up ratio is increased, resulting in increased strength. In any case, while perhaps not fully understood, Applicant has observed and measured increased strength under the conditions and methods described herein.

Articles can be produced by mixing the renewable carbohydrate-based polymeric material with the other polymeric material (e.g., a polyolefin such as polyethylene, or other plastic), heating the mixture, and feeding the molten mixture to a film blowing apparatus, which is specifically operated at a high blow up ratio and/or narrow die gap, which selection(s) is or are made specifically for the purpose of providing increased strength to the resulting film. The blown films can be further processed into a wide variety of conceivable structures, including, but not limited to plastic bags, film wraps, and the like.

Examples of suitable renewable carbohydrate-based or starch-based polymeric materials that have been shown to provide increased strength at high blow-up ratios and/or narrow die gaps are available from BiologiQ, under the tradename NuPlastiQ. Specific examples include, but are not limited to NuPlastiQ GP, NuPlastiQ CG, NuPlastiQ XP, NuPlastiQ XD, NuPlastiQ MB and NuPlastiQ BC. Specific characteristics of such NuPlastiQ materials will be described in further detail herein. Other renewable carbohydrate-based or starch-based polymeric materials may also be suitable for use so long as they are capable of, and specifically selected for the purpose of lending increased strength when blown into film at high blow up ratios and/or with narrow die gaps.

III. Exemplary Methods and Articles

FIG. 1 illustrates an exemplary process 100 that may be used to increase strength of a blown plastic film, by ensuring that a renewable carbohydrate-based polymeric material is included in a blend from which the plastic film is blown, and by specifically selecting a high blow up ratio and/or narrow die gap. At 102, the process 100 can include providing one or more first polymeric materials, e.g., including any plastic resins that can be blown into film, such as polyethylene, polypropylene, other polyolefins, polyethylene terephalate, polyester, nylon, polystyrene, high impact polystyrene copolymers, ABS, polyvinyl chloride, or the like. The first polymeric material may be a petrochemical-based polymeric material. It may also be a "green" version of such petrochemical-based polymeric materials (e.g., such as "green" polyethylene, available from Braskeem, or the like). It will be apparent that a wide variety of polymers may be suitable for use as the first polymeric material.

At 104, the process 100 can include providing one or more renewable carbohydrate-based polymeric materials, at least one of which is specifically selected for inclusion in the blend for its recognized ability to increase strength when blown at a high blow up ratio and/or narrow die gap. The one or more renewable carbohydrate-based polymeric materials can include starch-based polymeric materials. The renewable carbohydrate-based polymeric material may for example, be substantially amorphous, having a crystallinity of no more than 20%. Various other characteristics relating to elastic modulus (i.e., Young's modulus), glass transition temperature, or other characteristics may be present. NuPlastiQ available from Applicant is an example of such a material. The renewable carbohydrate-based polymeric materials and the first polymeric materials can be provided in a desired form, such as pellets, powders, nurdles, slurry, and/or liquids. In specific embodiments, the materials can be in the form of pellets. The method may further include blending the first polymeric material with the renewable carbohydrate-based polymeric material.

The materials may be mixed together at 106, forming a blend of the materials. At 108, they may be heated (e.g., melted in the case of thermoplastic materials) in preparation for blowing a film therefrom. At 110, a plastic film is blown using the film blowing apparatus using the mixture of materials. During such film blowing, the blow up ratio employed may be at least 2.0. As described herein, Applicant has discovered that the combination of including the renewable carbohydrate-based polymeric material in the blend, and using a blow up ratio of 2.0 or greater allows significant increases in strength for the film, particularly where also accompanied by a narrow die gap.

The renewable carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. As described in Applicant's earlier applications, strength can also be increased by using two or more different starches to form the renewable carbohydrate-based polymeric material. A plasticizer is also present within the mixture of components from which the renewable carbohydrate-based polymeric materials are formed. Water may also be used in forming the renewable carbohydrate-based polymeric material, although only a small to negligible amount of water is present in the finished renewable carbohydrate-based polymeric material.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content, the balance of the finished carbohydrate-based polymeric material may be attributed to the plasticizer (e.g., glycerin). The percentages above may represent starch percentage relative to the starting materials from which the carbohydrate-based polymeric material is formed, or that fraction of the finished carbohydrate-based polymeric material that is derived from or attributable to the plasticizer (e.g., at least 65% of the carbohydrate based polymeric material may be attributed to (formed from) the starch(es) as a starting material). Although some water may be used in forming the carbohydrate-based polymeric material, substantially the balance of the carbohydrate-based polymeric material may be attributed to glycerin, or another plasticizer. Very little residual water (e.g., less than 2%, typically no more than about 1%) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. Glyerin may be preferred.

The finished renewable carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The NuPlastiQ materials available from BiologiQ are examples of such finished renewable carbohydrate-based polymeric materials, although it will be appreciated that other materials available elsewhere (e.g., at some future time) may also be suitable for use.

In some embodiments, mixtures of different starches may be used in forming the carbohydrate-based polymeric material. Use of such a mixture of different starches (e.g., coming from different plants) has been found to surprisingly be associated with a synergistic increase in strength in articles including such renewable carbohydrate-based polymeric materials. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used.

Examples of suitable carbohydrate-based (e.g., starch-based) polymeric materials for use in forming films and other articles are available from BiologiQ, located in Idaho Falls, Id., under the tradename NuPlastiQ, and formerly "ESR" ("Eco Starch Resin"). Under the tradename ESR, such materials have previously been referred to as GS-270, GS-300, and GS-330. Physical characteristics for two examples of NuPlastiQ materials, previously referred to as GS-270 and GS-300, are shown in Table 1 below.

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm$^3$ | 1.42 g/cm$^3$ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |
| Glass Transition Temp. | ASTM D-3418 | 81-100° C. | 81-100° C. |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

The above characteristics shown for GS-270 and GS-300 are exemplary of other NuPlastiQ products available from BiologiQ, although values may vary somewhat. For example, NuPlastiQ products from BiologiQ may generally have a glass transition temperature ranging from about 70° C. to about 100° C. Those of skill in the art will appreciate that glass transition temperature can be indicative of degree of crystallinity. Values for melting temperature range, density, Young's Modulus, and water content may be identical or similar to those shown above in Table 1. Some characteristics may similarly vary somewhat (e.g., ±25%, or ±10%) from values shown for GS-270 and GS-300. For example, with respect to density, the renewable starch-based polymeric material may have a density greater than 1.25 g/cm$^3$. NuPlastiQ has a substantially amorphous structure (e.g., more amorphous than typical raw starch). For example, typical raw starch powder has a mostly crystalline structure (e.g., greater than 50%), while NuPlastiQ has a mostly amorphous structure (e.g., less than 10% crystalline).

Young's modulus of the renewable carbohydrate-based polymeric material may be greater than the Young's modulus of the first polymeric material with which it is blended. Young's modulus may be at least 1 GPa, at least 1.1 GPa, e.g., 1.0 GPa, 1.1 GPa, 1.2 GPa, 1.3 GPa, 1.4 GPa, or 1.5 GPa. Glass transition temperature may range from 70° C. to 100° C., be greater than 75° C., or at least 80° C. (e.g., 80° C. to 100° C.).

NuPlastiQ has a low water content, as described. As NuPlastiQ absorbs moisture, it exhibits plastic behavior and becomes flexible. When removed from a humid environment, the material dries out and becomes stiff again (e.g., again exhibiting less than about 1% water content). The moisture present in NuPlastiQ (e.g., in pellet form) may be released in the form of steam during formation of a blown film or other article. As a result, films produced from a renewable starch-based polymeric material such as NuPlastiQ blended with the first polymeric material may exhibit even lower water content, as the first polymeric material typically will include no or negligible water, and the water in the NuPlastiQ may typically be released during manufacture of a film.

Low water content in the renewable carbohydrate-based polymeric material can be important, as significant water content can result in incompatibility with the first polymeric material, which is particularly the case when blowing a thin film. For example, as the water vaporizes, this can result in voids within the film, as well as other problems. When blowing a thin film, the carbohydrate-based polymeric material used may preferably include no more than about 1% water. This is a significant problem with many other thermoplastic starch (TPS) materials available in the art, many of which include a far higher fraction of water, making blowing of a film impossible as a practical matter. Even Cardia BL-F, which is described as including less than 1% water, does not appear to be readily capable of being blown into thin films. For example, the films described in Leufgens were 3 mils thick, which is far thicker than films employed for typical film purposes (e.g., wraps, bags, and the like).

Low water content is not achieved in the NuPlastiQ material through esterification, as is common in some conventional TPS materials that may include relatively low water content. In at least some embodiments, the same may be said for etherification. Such esterification can be expensive and complex to perform. Furthermore, the NuPlastiQ materials that are exemplary of the renewable carbohydrate-based polymeric materials employable herein also typically do not themselves actually include any identifiable starch, or identifiable glycerin, as such, as the starting materials of the NuPlastiQ or other carbohydrate-based polymeric material have been chemically reacted and/or altered (e.g., through a reactive extrusion process). X-ray diffraction patterns of exemplary carbohydrate-based polymeric materials as described below (e.g., and shown in FIG. 3) evidence such chemical alteration, showing that the finished polymeric material may be substantially devoid of starch in such identifiable, native form. In other words, the renewable carbohydrate-based polymeric material is not simply recognized as a mixture including starch and glycerin. The low water content achievable in the renewable carbohydrate-based polymeric material is believed to be due at least in part to the chemical alteration of the starch and plasticizer materials into a thermoplastic polymer, which does not retain water as would native starch, or conventional thermoplastic starches.

Returning to FIGS. 1-2, processing at relatively high temperatures may result in some release of volatized glycerin (e.g., visible as smoke). If needed (e.g., where stored pellets may have absorbed additional water), drying of NuPlastiQ pellets can be performed by simply introducing warm dry air, e.g., at 60° C. for 1-4 hours, which is sufficient to drive off any absorbed water. NuPlastiQ Pellets should be dried to less than about 1% moisture content prior to processing, which is particularly important when blowing a film. NuPlastiQ pellets may simply be stored in a sealed container with a desiccant in a dry location, away from heat to minimize water absorption, and to prevent undesired degradation.

In addition to NuPlastiQ being thermoplastic, the NuPlastiQ may also be thixotropic, meaning that the material is solid at ambient temperature, but flows as a liquid when heat, pressure and/or frictional movement are applied. Advantageously, pellets of NuPlastiQ can be used the same as petrochemical based pellets (any typical non-biodegradable plastic resin pellets) in standard plastic production processes. NuPlastiQ materials and products made therefrom may exhibit gas barrier characteristics. Products (e.g., films) made using such NuPlastiQ pellets exhibit oxygen gas barrier characteristics (e.g., see Examples of Applicant's previous filings, already incorporated by reference). NuPlastiQ materials may be non-toxic and edible, made using raw materials that are all edible. NuPlastiQ and products made therefrom may be water resistant (even hydrophobic, with wettability of less than 40, or less than 35 dyne/cm), but water soluble. For example, NuPlastiQ may resist swelling under moist heated conditions to the point that pellets (e.g. with a size of 3-4 mm) thereof may not completely dissolve in boiling water within 5 minutes, but a pellet will dissolve in the mouth within about 10 minutes. NuPlastiQ may be stable, in that it may not exhibit any significant retrogradation, even if left in relatively high humidity conditions, which characteristic differs from many other thermoplastic starch materials. Of course, products made with NuPlastiQ may also exhibit such characteristics. If NuPlastiQ is stored in humid conditions, the excess absorbed water can simply be evaporated away, and once the water content is no more than about 1%, it can be used in forming a film or other article.

NuPlastiQ can be cost competitive, being manufactured at a cost that is competitive with traditional polyethylene plastic resins. NuPlastiQ can be mixed with other polymers, such as non-biodegradable polymers including, but not limited to PE, PP, PET, polyester, polystyrene, acrylonitrile butadiene styrene (ABS), polyvinyl chloride, nylon, and others. NuPlastiQ can also be blended with biodegradable and/or compostable polymers including, but not limited to polylactic acid (PLA), poly(butylene adipate-co-terephthalate) (PBAT), polybutylene succinate (PBS), polycaprolactone (PCL), polyhydroxyalkanoates (PHA), other so-called thermoplastic starches, and the like. PBS, PCL, and PHA are polyesters. EcoFLEX™ is an example of a PBAT plastic material with which the NuPlastiQ carbohydrate-based polymeric material may be blended. For example, NuPlastiQ may be blended with any material that itself can be blown into film, and the blend may be used to blow a desired film, using the presently described methods.

In some embodiments, the NuPlastiQ could be provided in a masterbatch formulation that may include the renewable carbohydrate-based polymeric material as described above, and an amount of one or more compatibilizers. The masterbatch may also include one or more other polymeric materials. Such masterbatch formulation pellets could be mixed with pellets of the first polymeric material at the time of processing. Any conceivable ratios may be used in mixing such different pellets, depending on the desired percentage of NuPlastiQ and/or compatibilizer and/or conventional polymeric material in the finished article.

NuPlastiQ includes very low water content. For example, although raw starch (e.g., used in forming NuPlastiQ) may typically include about 13% water by weight, the finished NuPlastiQ pellets available from BiologiQ include less than about 1% water. NuPlastiQ materials are biodegradable, and as described herein, not only is the starch-based NuPlastiQ material biodegradable, but when blended with other polymers, the blended material becomes substantially entirely biodegradable. Typical thermoplastic starch materials do not claim to or exhibit such characteristics when blended with other plastic materials.

The NuPlastiQ materials described as suitable for use herein as the carbohydrate-based (e.g., starch-based) polymeric material are substantially amorphous. For example, raw starch powder (e.g., such as is used in making NuPlastiQ and various other thermoplastic starch materials) has approximately a 50% crystalline structure. NuPlastiQ materials available from BiologiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the NuPlastiQ material available from BiologiQ does not revert back to a mostly crystalline structure. In addition, it can maintain a stable, relatively high degree of optical clarity, so as to be useful in forming relatively optically clear films (e.g., particularly by sandwiching NuPlastiQ containing layers between polyethylene or other polyolefin layers).

Figure 3:
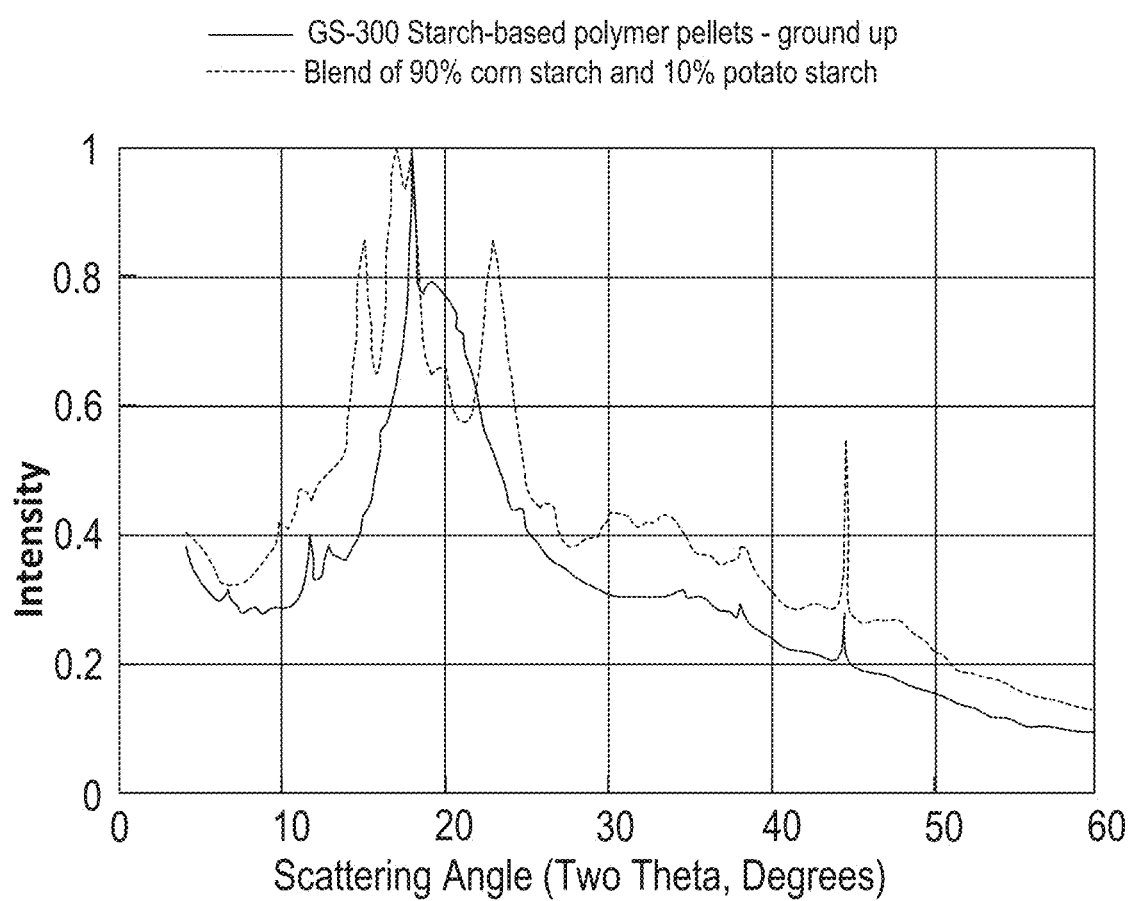
FIG. 3 shows X-ray diffraction patterns for an exemplary renewable carbohydrate-based NuPlastiQ polymeric material commercially available from BiologiQ as compared to that of the blend of native corn starch and native potato starch used to form the NuPlastiQ.

In contrast to typical TPS materials, the NuPlastiQ materials that are suitable examples of starch-based polymeric materials for use in forming articles described in the present application have an amorphous microstructure, and physical characteristics as shown in Table 1. The difference in the molecular structure between conventional TPS and NuPlastiQ materials is evidenced by the NuPlastiQ materials as described herein being much less crystalline than conventional thermoplastic starch-based materials as shown by X-ray diffraction, shown in FIG. 3, comparing diffraction pattern results for NuPlastiQ material available from BiologiQ (sample 1) as compared to a blend of native raw corn starch and native raw potato starch, from which the NuPlastiQ in FIG. 3 was formed. The diffraction pattern of the NuPlastiQ as seen in FIG. 3 is much less crystalline (e.g., crystallinity of less than about 10%) than that of the native starch blend (crystallinity of about 50%). The difference in diffraction pattern evidences that a substantial chemical change has occurred in the material, due to processing from the native starches into NuPlastiQ. For example, while there is a prominent diffraction peak between 20-25° with the native starch, no such peak is exhibited in the NuPlastiQ. The native starch further shows a strong peak at about 45° (at an intensity of 0.5 to 0.6), which peak is greatly reduced in the NuPlastiQ (an intensity of only about 0.25 to 0.3). Across nearly the entire spectrum, the diffraction intensities are higher for the native starches than for the NuPlastiQ, with the exception of from about 18° to about 22°, as shown. The elevated diffraction intensity seen across a wide spectrum is indicative of greater crystallinity of the native starches as compared to the NuPlastiQ. Numerous other differences also exist, as shown.

By way of example, the carbohydrate-based (e.g., starch-based) polymeric material used in making films according to the present disclosure may have a crystallinity of less than about 40%, less than about 35%, less than about 30%, less than about 25%, less than about 20%, less than about 15%, less than about 10%, less than 9%, less than about 8%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to such characteristics, NuPlastiQ is not only biodegradable, but has the ability to lend biodegradability to whatever plastic material it is blended with. Such ability to lend biodegradability is incredibly advantageous, and very surprising within the field. Third party testing evidencing such surprising results is described in various of Applicant's other applications, already incorporated by reference. The ESR material does not typically undergo biodegradation under typical storage conditions, even in relatively humid conditions, as the other conditions typical of a landfill, compost or similar disposal environment containing the particular needed microorganisms are not present. Of course, where such conditions are present, not only does the NuPlastiQ biodegrade, but otherwise non-biodegradable plastic materials blended therewith surprisingly also biodegrade.

In addition to the differences in the microstructure of the finished NuPlastiQ as compared to the starting materials, films produced from a blend including the renewable carbohydrate-based polymeric material are different from articles that are otherwise similar, but formed using conventional TPS and starch powder, or other conventional plastic materials alone. For example, articles formed by blending the renewable carbohydrate-based polymeric materials such as NuPlastiQ as described herein with a conventional polymeric material do not have "sea-island" features that are common when blending conventional TPS materials with polymeric materials such as polyethylene. Instead, the NuPlastiQ becomes homogenously dispersed throughout the blend. Properties of the different films can be seen by comparing the physical properties of films as shown in Table 11 of Example 5 of Applicant's U.S. patent application Ser. No. 15/481,806, already incorporated by reference. In particular, this table compares the physical properties of films made by blending renewable carbohydrate-based polymeric materials as contemplated herein with polyethylene versus a conventional TPS (Cardia BL-F) blended with PE.

Multilayer films formed from a blend of Cardia BL-F and PE are described in WO 2014/0190395 to Leufgens, which are significantly weaker than the presently described films, because of the different TPS material used, as well as selection of the particular blow up ratio and/or die gap characteristics selected. For example, the film blown in Leufgens is 80 microns thick (i.e., more than 3 mils), and exhibits strength that is actually less than that of a 100% PE film. In contrast, the particular selections described herein allow strength at any given thickness to actually increase as compared to a 100% "first polymeric material" (e.g., PE, particularly LLDPE) control. Furthermore, the present methods allow production of films having a desired level of strength at far lower thicknesses. Such ability to achieve a desired level of strength at significantly less thickness also reduces the amount of material being used in the film layer, leading to further cost savings, and greater sustainability gains.

As described herein, blending of the particular renewable carbohydrate-based polymeric materials as described herein with a first polymeric material and then blowing a plastic film with a film blowing apparatus using the mixture of materials, at a blow up ratio of at least 2.0 and/or with a narrow die gap (e.g., no more than 500 microns) has been found by the present inventors to provide thin films (e.g., less than 2 mils, e.g., 0.1 to 1.5 mils) that actually exhibit greater strength than an otherwise similar film, blown with just the first polymeric material (e.g., PE).

Without being bound to any particular theory, it is believed that the particular renewable carbohydrate-based polymeric resins which are substantially amorphous, when blown at such high blow up ratios and/or narrow die gaps facilitate a desirable alignment, orientation, and/or stretching of the different polymer molecules of the blend, in a way that increases the strength of the resulting blended plastic film.

For example, polymers are formed with both crystalline (regularly packed) structures and amorphous (randomly arranged) structures. Many polymers (such as polyethylene) contain a high degree of crystallinity, although they may include some amorphous regions randomly arranged and entangled throughout the polymeric structure. The particular renewable carbohydrate-based polymeric materials employed are not highly crystalline, but substantially amorphous. While not being bound to any particular theory, it is believed that the combination of the relatively crystalline first polymeric material and the amorphous renewable carbohydrate-based polymeric materials undergo orientation, alignment, and stretching of the components, in a way that allows the components of the blend to be homogeneously blended together, but orientationally aligned and stretched in a way that results in increased strength. Such increases may be observed in both the machine direction (MD) and the transverse direction (TD), such that the observed phenomenon is not simply trading off strength in one direction with that in another direction. Such is evident in dart drop impact data, which accounts for strength in both directions. Strength in the MD and the TD may be similar to one another, e.g., with a ratio of one to the other (e.g., MD/TD) being from 0.7 to 1.3, 0.8 to 1.2, or 0.9 to 1.1.

Such increased strength through the selection of the particular amorphous renewable carbohydrate-based material, and selection of the high blow up ratios, e.g., and/or use of a narrow die gap advantageously provides increased strength, within a thin film, often thinner than achievable with other TPS containing blends, such as Cardia BL-F. In some cases, the films can even be blown as thin as, or even thinner than is possible when blowing the first polymeric material alone. For example, Applicant has observed an ability to blow films from a blend of polyethylene and the renewable carbohydrate-based polymeric material that are as thin as, or even thinner than the thinnest films that can be blown with polyethylene alone.

Returning to FIG. 1, at 106, the process 100 includes mixing the one or more first polymeric materials and the one or more renewable carbohydrate-based polymeric materials to produce a mixture of materials. In some cases, the mixing of the one or more non-biodegradable plastic materials and the one or more carbohydrate-based materials can be performed using one or more mixing devices. In a particular implementation, a mechanical mixing device can be used to mix the one or first polymeric materials and the one or more renewable carbohydrate-based polymeric materials. In an implementation, at least a portion of the components of the mixture of the materials can be combined in an apparatus, such as an extruder (e.g., of the film blowing apparatus) or the like. In other implementations, at least a portion of the components of the mixture of the materials can be combined before being fed into the film blowing apparatus.

The one or more renewable carbohydrate-based polymeric materials can be present in the mixture of materials in an amount sufficient to lend increased strength to the particular first polymeric material that the renewable carbohydrate-based polymeric material is blended with, when processed as described. Such threshold level of the renewable carbohydrate-based polymeric material may depend on the material it is being blended with. By way of example, the renewable carbohydrate-based polymeric material may be included in an amount of at least 1%, at least 2%, at least 3%, at least 4%, at least 5%, at least 10%, at least 15%, at least 20%, no greater than 99%, no greater than 95%, no greater than 90%, no greater than 80%, no greater than 70%, no greater than 60%, no greater than 50%, from 5% to 90%, from 20% to 40%, from 10% to 40%, from 20% to 30%, or any other range defined between the above values. More than one renewable carbohydrate-based polymeric material, and/or more than one first polymeric material may be included in the blend, if desired.

The first polymeric material can be present in the mixture of materials in an amount of at least at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50%, or any other range defined between the above values.

A compatibilizer may be present in the mixture of materials. The compatibilizer can be mixed with the first polymeric material, the renewable carbohydrate-based polymeric material, mixed with both, or provided separately. Often the compatibilizer may be provided with at least one of the polymeric materials, e.g., included in a masterbatch formulation. The compatibilizer can be a modified polyolefin or other modified plastic, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinyacetate) based compatibilizer. In an embodiment, the compatibilizer may be a grafted version of the first polymeric material (e.g., maleic anhydride grafted polyethylene where the first polymeric material is polyethylene) or a copolymer (e.g., a block copolymer) where one of the blocks is of the same monomer as the first polymeric material (e.g., a styrene copolymer where the first polymeric material is styrene based).

The mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer. In an embodiment, no compatibilizer may be present.

Although certainly not required, and in at least some embodiments the inclusion of such would be best avoided, it is within the scope of the present invention to include any of a variety of UV and OXO degradable additives, such as PDQ-M, PDQ-H, BDA, and OxoTerra™ from Willow Ridge Plastics, OX1014 from LifeLine, or organic additives such as Restore® by Enso, EcoPure® by Bio-Tec Environmental, ECM Masterbatch Pellets 1M by ECM Biofilms, or Biodegradable 201 and/or Biodegradable 302 BioSphere®. Other additives, for example, for further increased strength (e.g., Biomax® Strong from Dupont), may be included.

One or more such additives can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%., or from 2% by weight to 6% by weight of the mixture. Additional details regarding addition of such additives is found in Applicant's U.S. patent application Ser. No. 16/391,909, filed Apr. 23, 2019, herein incorporated by reference in its entirety.

Referring to FIG. 1, at 108, the process 100 may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 200° C., no greater than 190° C., no greater than 180° C., no greater than 175° C., no greater than 170° C., no greater than 165° C., no greater than 160° C., no greater than 155° C., no greater than 150° C., from 95° C. to 205° C., from 120° C. to 180° C., or from 125° C. to 165° C.

The mixture of materials including the first polymeric material and the renewable carbohydrate-based polymeric material can be heated in one or more chambers of an extruder. In some cases, one or more chambers of the extruder can be heated at different temperatures. The speed of one or more screws of the extruder can be any desired rate.

At 110, a film is produced using the mixture of materials. Any conceivable article formed of plastic film may be formed from the mixture, e.g., including but not limited to film wraps, bags, films configured for other purposes, and the like. The film is formed using a die by injecting a gas into the heated mixture of material to form the film (i.e., blowing the film). Such a film blowing apparatus, and the associated die is shown in greater detail in FIGS. 2B-2C. Films can be sealed and/or otherwise modified to be in the form of a bag or other article.

Films can comprise a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm.

Films can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Films can have a dart drop impact test value of at least 150 g, at least 175 g, at least 200 g, at least 225 g, at least 250 g, at least 275 g, at least 300 g, no greater than 400 g, no greater than 375 g, no greater than 350 g, or no greater than 325 g, from 140 g to 425 g, from 200 g to 400 g, from 250 g to 350 g, from 265 g to 330 g. In an implementation, such values may be for whatever the thickness of the film is. In another implementation, such values may for a 1 mil thickness film formed from the mixture of materials (i.e., given strength value per mil of thickness). As noted above, Applicant is not aware of others even being able to blow films at 1.5 mil or less, such as 1 mil or less, while including a renewable polymeric material. As noted above, the Cardia BL-F TPS/PE films described in Leufgens were more than 3 mils thick. While some thinner cast films may be described in the literature, there does not seem to be an understanding of how to achieve a blown thin film, including renewable component content. Of course, when casting a film, there is no blow up ratio to manipulate. Blown thin films exhibiting excellent strength are possible when formed according to the methods described herein.

The article can have a tensile strength at break test value in the machine direction of at least 3.5 kpsi, at least 3.7 kpsi, at least 3.9 kpsi, at least 4.1 kpsi, at least 4.3 kpsi, or at least 4.5 kpsi, no greater than 5.5 kpsi, no greater than 5.3 kpsi, no greater than 5.1 kpsi, no greater than 4.9 kpsi, or no greater than 4.7 kpsi, from 3.5 kpsi to 5.5 kpsi, or from 4.1 kpsi to 4.9 kpsi. In an implementation, such values may be for whatever the thickness of the film is. In another implementation, such values may for a 1 mil thickness film formed from the mixture of materials.

The article can have a tensile strength at break test value in the transverse direction of at least 3.2 kpsi, at least 3.4 kpsi, at least 3.6 kpsi, at least 3.8 kpsi, at least 4.0 kpsi, at least 4.2 kpsi, no greater than 5.7 kpsi, no greater than 5.5 kpsi, no greater than 5.3 kpsi, no greater than 5.1 kpsi, no greater than 4.9 kpsi, no greater than 4.7 kpsi, no greater than 4.5 kpsi, from 3.2 kpsi to 5.7 kpsi, or from 3.6 kpsi to 5.0 kpsi. In an implementation, such values may be for whatever the thickness of the film is. In another implementation, such values may for a 1 mil thickness film formed from the mixture of materials.

The article can have a tensile elongation at break test value in the machine direction of at least 550%, at least 560%, at least 570%, at least 580%, at least 590%, at least 600%, at least 610%, at least 620%, no greater than 725%, no greater than 710%, no greater than 700%, no greater than 680%, no greater than 665%, no greater than 650%, no greater than 635%, from 550% to 750%, or from 600% to 660%. In an implementation, such values may be for whatever the thickness of the film is. In another implementation, such values may for a 1 mil thickness film formed from the mixture of materials.

The article can have a tensile elongation at break test value in the transverse direction of at least 575%, at least 590%, at least 600%, at least 615%, at least 630%, or at least 645%, no greater than 770%, no greater than 755%, no greater than 740%, no greater than 725%, no greater than 710%, no greater than 695%, no greater than 680%, from 575% to 775%, or from 625% to 700%. In an implementation, such values may be for whatever the thickness of the film is. In another implementation, such values may for a 1 mil thickness film formed from the mixture of materials.

Where applicable the article can have an Elmendorf tear force test value in the machine direction of at least 280 g/mil, at least 300 g/mil, at least 320 g/mil, at least 340 g/mil, or at least 360 g/mil, no greater than 450 g/mil, no greater than 430 g/mil, no greater than 410 g/mil, no greater than 390 g/mil, or no greater than 370 g/mil, from 275 g/mil to 475 g/mil, or from 325 g/mil to 410 g/mil. Such values account for film thickness.

Where applicable the article can have an Elmendorf tear force test value in the transverse direction of at least 475 g/mil, at least 490 g/mil, at least 500 g/mil, at least 525 g/mil, at least 540 g/mil, or at least 550 g/mil, no greater than 700 g/mil, no greater than 680 g/mil, no greater than 650 g/mil, no greater than 625 g/mil, no greater than 600 g/mil, no greater than 580 g/mil, or no greater than 570 g/mil, from 475 g/mil to 725 g/mil, or from 490 g/mil to 640 g/mil. Such values account for film thickness.

Where applicable the article can have a secant modulus of elasticity test value in the machine direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi. In an implementation, such values may be for whatever the thickness of the film is. In another implementation, such values may for a 1 mil thickness film formed from the mixture of materials.

Where applicable the article can have a secant modulus of elasticity test value in the transverse direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi. In an implementation, such values may be for whatever the thickness of the film is. In another implementation, such values may for a 1 mil thickness film formed from the mixture of materials.

As described herein, articles including a renewable carbohydrate-based polymeric material and another polymeric material (the "first polymeric material") and formed at a the described high blow up ratios and/or narrow die gaps can have values of strength properties that are greater than articles formed from the first polymeric material alone. Such an increase in strength is advantageous and surprising, e.g., as compared to the state of the art. For example, while Leufgens describes films blown from a blend of a starch-based polymeric material (Cardia BL-F) and polyethylene, the resulting films exhibit lower tensile strength (FIG. 2 of Leufgens), and lower dart drop impact strength (FIG. 5 of Leufgens) as compared to an otherwise similar film formed from the polyethylene alone. This is so, even when the blend of Cardia BL-F and polyethylene are blown at a blow up ratio of 3:1. Such is evidence that the increase in strength does not occur with just any renewable carbohydrate-based polymeric material, at least at the particular conditions used in Leufgens (which also included a relatively wide die gap of 1.6 to 1.8 mm). As the examples show, increased strength does occur when using the present renewable carbohydrate-based polymeric materials having low crystallinity and/or the other specific characteristics associated with NuPlastiQ. In an embodiment, the polymeric resin material being blended with the NuPlastiQ or similar renewably sourced carbohydrate-based polymeric material may have a modulus of elasticity that is lower than that of NuPlastiQ (e.g., less than 1.5 GPa, or less than 1 GPa).

Increases in strength (e.g., whether tensile strength, dart drop impact strength, or other strength measurements) may be at least about 1%, at least about 2%, at least about 3%, at least about 5%, at least about 10%, at least about 15%, at least about 20%, from 1% to 50%, from 1% to 40%, or from 10% to 40% as compared to an otherwise identical article, but which is formed from the first polymeric material alone (i.e., no renewable carbohydrate-based polymeric material or compatibilizer).

Strength may also be increased by employing two different starches in forming the renewable carbohydrate-based polymeric material. Details of such increased strength attributable to use of two different starches is found within U.S. patent application Ser. No. 15/481,806 and Applicant's issued U.S. Pat. No. 10,214,634, each of which is incorporated by reference herein in its entirety. In an embodiment, both (i) a mixture of starches, and (ii) blow up ratio and/or die gap may be used as described herein, to achieve a desired increase in strength.

Figure 2A:
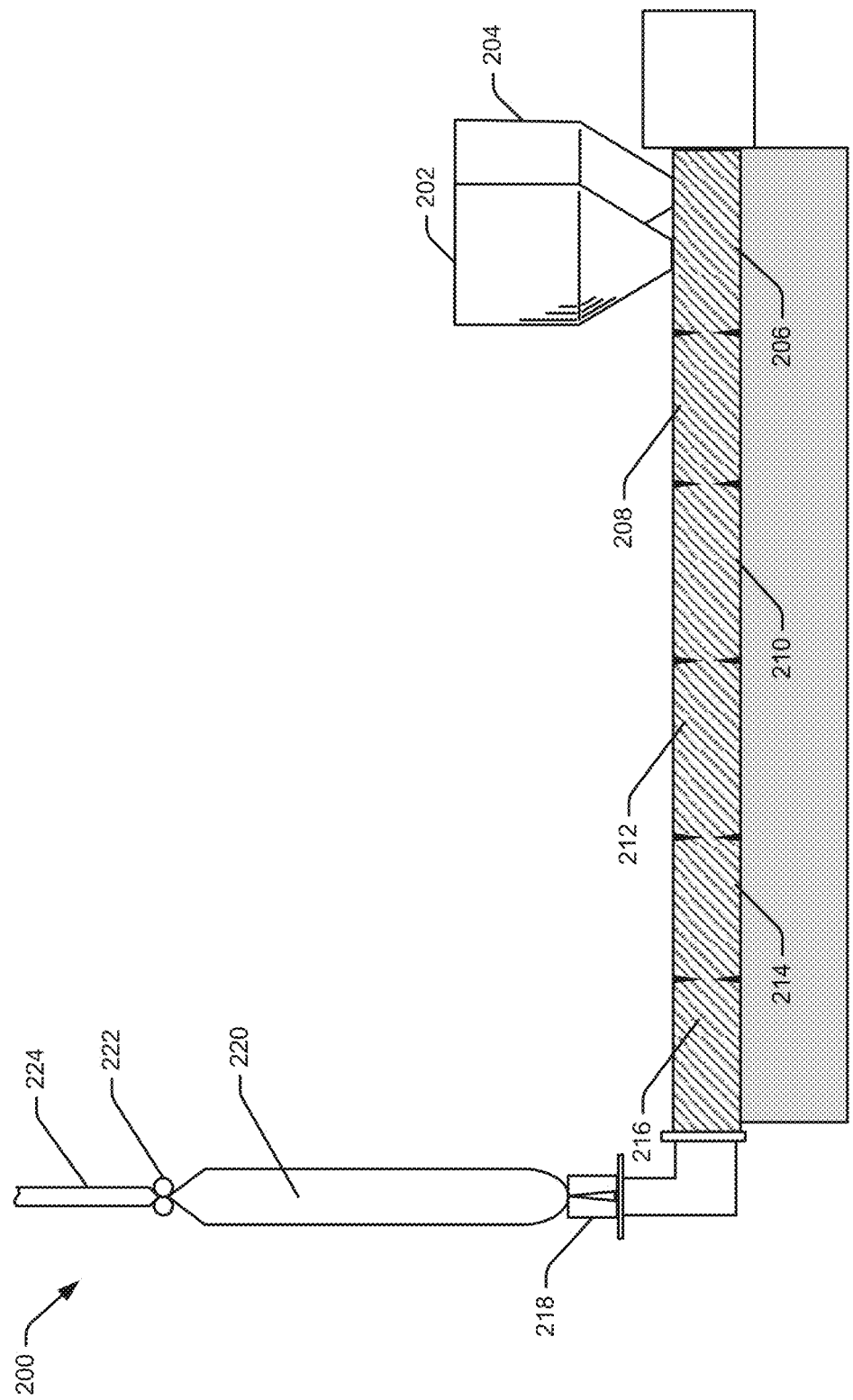
FIG. 2A illustrates components of an example manufacturing system for performing the present methods.

FIG. 2A illustrates components of an exemplary film blowing apparatus 200. The film blowing apparatus 200 can be used in the process 100 of FIG. 1. The apparatus 200 is also shown as including extruder components.

By way of example, or more first polymeric materials and one or more renewable carbohydrate-based polymeric materials are provided via first and second hoppers 202, 204. A compatibilizer may be included with either or both materials (e.g., in a masterbatch thereof). In another embodiment, the renewable carbohydrate-based polymeric material, the compatibilizer, and the first polymeric material (e.g., a plastic such as polyethylene) may be compounded all together, at the desired ratios so that such homogenous masterbatch pellets may be fed into a single hopper 202 or 204.

Where two different pellets or other materials are used, the one or more renewable carbohydrate-based polymeric materials and the one or more first polymeric materials can be mixed in a first chamber 206 to produce a mixture of materials. In some cases, the mixture of materials can include from 5% by weight to 40% by weight of the one or more renewable carbohydrate-based polymeric materials, from 60% by weight to 94% by weight of the one or more first polymeric material, and from 1% by weight to 9% by weight of the one or more compatibilizers. The ranges of course may be varied outside the above ranges, depending on desired characteristics.

The mixture of materials can pass through a number of chambers, such as the first chamber 206, a second chamber 208, a third chamber 210, a fourth chamber 212, a fifth chamber 214, and an optional sixth chamber 216. The mixture of materials can be heated in chambers 206-216. Those of skill in the art will appreciate that temperature of any given chamber may differ from that of other chamber(s). For example, first chamber 206 may be heated to 120° C. to 140° C.; second chamber 208 may be heated to 130° C. to 160° C.; third chamber 210 may be heated to 135° C. to 165° C.; fourth chamber 212 may be heated to 140° C. to 170° C.; and fifth and sixth chambers 214, 216 may be heated to 145° C. to 180° C.

The heated mixture is extruded using die 218 of the film blowing apparatus 200 to form a film. In film blowing, a gas is injected into the extruded "bubble" to expand it (e.g., with a pressure from 105 bar to 140 bar). The resulting bubble 220 can be drawn up through rollers 222 to create a film 224 with a thickness typically from 0.02 mm (about 0.8 mil) to 0.05 mm (about 2 mil). Even thinner films can be made using the blends and methods as described herein, e.g., having a thickness as little as 0.1 mil (0.0025 mm). Of course, thicknesses greater than 2 mil can also be achieved, although such is typically not necessary. For example, in existing state of the art systems where films are blown from starch-based polymeric materials, the thicknesses are typically quite thick (e.g., Leufgens is about 3 mils), as thinner films are typically not possible with state of the art thermoplastic resins and methods.

The ability to blow far thinner films, as described herein, having increased strength characteristics is quite advantageous. For example, while others may describe the ability to blow films including a starch-based polymeric component, any sustainability gains are minimal, if even present at all, where the thickness of the resulting film from such systems is so thick. Increased thickness necessarily consumes more plastic resin material. Thus, where it may have been possible to provide a film having desired strength characteristics that could be blown of pure polyethylene at a thickness of say 1 mil, many existing blends including thermoplastic starch materials have not been able to demonstrate the ability to blow a 1 mil film, but are required to blow a far thicker film—say 3 mils, which consumes 3 times as much total resin material. If the starch-based polymeric material only accounts for 20-50% of the total plastic resin material, then the actual amount of polyethylene or other "first polymeric material" required is actually greater than what would have been used if just using the 1 mil thick film formed from polyethylene or other "first polymeric material" alone. Thus, use of many of the existing thermoplastic starch materials to form films using the state of the art methods may not actually represent any significant sustainability benefit at all.

The present films may comprise a single layer, or multiple layers. Where multiple layers are present, at least one of the layers includes the renewable carbohydrate-based polymeric material. The renewable carbohydrate-based polymeric material may be present in all layers.

Figure 2B:
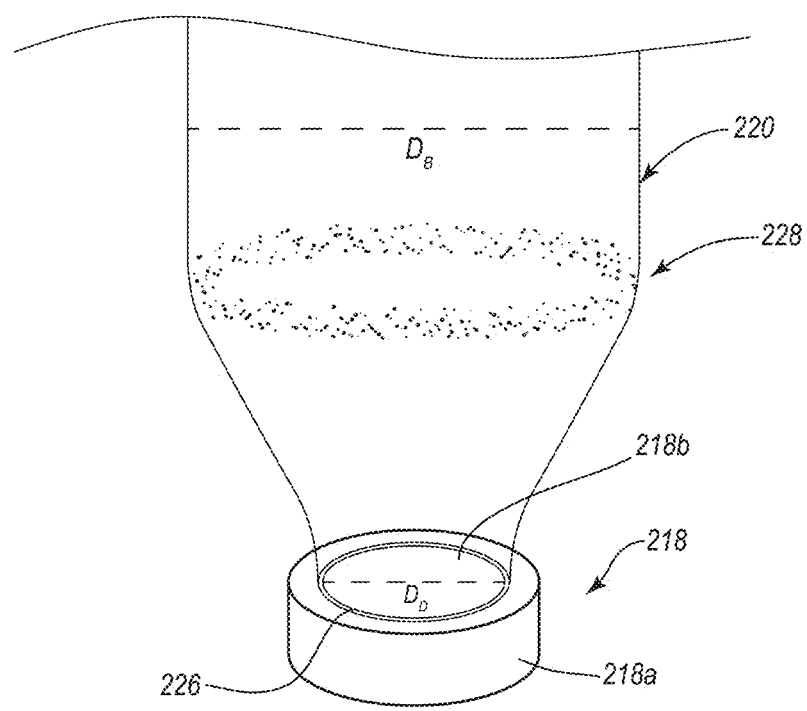
FIG. 2B illustrates a close-up schematic view of the film blowing apparatus of FIG. 2A, showing the die, the die gap, the blown film bubble having a high blow-up ratio, and the frost line of the bubble.
Figure 2C:
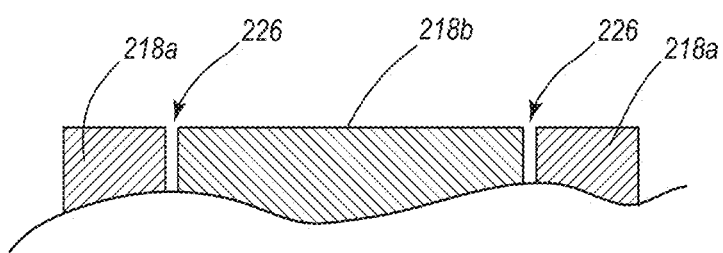
FIG. 2C illustrates a close-up schematic cross-sectional view through a portion of the die of FIG. 2B, showing the narrow die gap.

FIGS. 2B and 2C schematically illustrate die 218, and the formation of bubble 220. As shown in FIGS. 2B and 2C, the die 218 may include an outer member 218a and an inner member 218b, with a die gap 226 defined therebetween. As described herein, die 218 may be particularly configured to provide a narrow die gap, e.g., less than 1000 microns, less than 900 microns, less than 800 microns, less than 700 microns, less than 600 microns, or less than 500 microns (e.g., 200 to 500 microns). This narrow die gap is in sharp contrast to the wide die gaps used (and perhaps necessary) in the state of the art when blowing films including other thermoplastic starch components. For example, Leufgens describes die gaps of 1.6 to 1.8 mm (i.e., 1600 to 1800 microns). Even at a high blow up ratio, use of such a large die gap may make it impossible to achieve the increases in strength described herein.

FIG. 2B further illustrates the relatively high blow up ratio, which is defined as the ratio between the maximum diameter of the bubble (DB) divided by the diameter at the die gap ($D_D$). Stated another way, related to the lay flat width of the film, the blow up ratio is equal to 0.637*(Lay Flat Width)/$D_D$. The frost line 228 is also shown in FIG. 2B, the point at which the previously molten material of the bubble begins to crystallize, so as to have a more translucent appearance above such crystallization region at the frost line 228. As described herein, the blow up ratio is at least 2.0, e.g., 2.1, 2.2, 2.3, 2.4, 2.5, 2.6, 2.7, 2.8, 2.9, 3.0, 2.2 to 2.8, or about 2.5. The present inventors have observed increased strength for the film simply by increasing the blow up ratio, from a typical blow forming blow up ratio of say 1.5 to a value of at least 2, such as 2.5. Strength has been observed to increase for values up to about 3, after which no significant further increases in strength were observed, such that values of 2-3, 2.2 to 2.8, or about 2.5 are particularly appropriate. As described herein, the die gap may be maintained at a narrow value, to also contribute to the described increases in strength, when blowing blends including the particularly described renewable carbohydrate-based polymeric materials.

By way of example, die gaps of less than 500 microns and blow up ratios of at least 2 (e.g., 2.2 to 2.8, or about 2.5) are particularly well suited to blowing films from such blends having thicknesses of up to 1.5 mils (e.g., 0.1 mil to 1.5 mils). In order to blow thicker films (where a thicker film were needed), the die gap may need to be increased to accommodate flow of the molten material therethrough. For example, in order to blow a very thick film of 10 mils, or even 5 mils, the die gap may need to be increased somewhat.

EXAMPLES

Example 1

Dart impact test strength is measured for various films, including films formed from polyethylene alone, and films formed from a blend of NuPlastiQ (the renewable carbohydrate-based polymeric material), polyethylene, and a compatibilizer. The films formed from a blend include 25% renewable carbohydrate-based polymeric material, 5% compatibilizer, and 70% polyethylene. All films are blown at a blow up ratio of about 2.5. Applicants have observed that while an increase in strength is observed when blowing films at increased blow up ratios with the blends, blow up ratio does not have any significant effect on strength when blowing a film from polyethylene alone. In other words, with polyethylene alone, the strength is substantially the same whether the blow up ratio is 1.5, 3, or anywhere in between. Table 2 below shows approximate dart impact strength values (in g) for various thickness films of the present invention compared to a control, as well as the percentage strength increase for the various blends as compared to the control. In Table 2, NuPlastiQ is abbreviated "NPQ".

TABLE 2

| Thickness (mil) | 100% PE (BUR of 1.5-2.5) Control | 10% NPQ (BUR = 2.5) | | 20% NPQ (BUR = 2.5) | | 25% NPQ (BUR = 2.5) | | 30% NPQ (BUR = 2.5) | |
|---|---|---|---|---|---|---|---|---|---|
| 0.5 | 150 | 152 | 1% | 160 | 7% | 170 | 13% | 195 | 30% |
| 1.0 | 210 | 240 | 14% | 260 | 24% | 265 | 26% | 275 | 31% |
| 1.5 | 250 | 320 | 28% | 340 | 36% | 350 | 40% | 335 | 34% |
| 2.0 | 290 | 380 | 31% | 420 | 45% | 430 | 48% | 380 | 31% |

Figure 4:
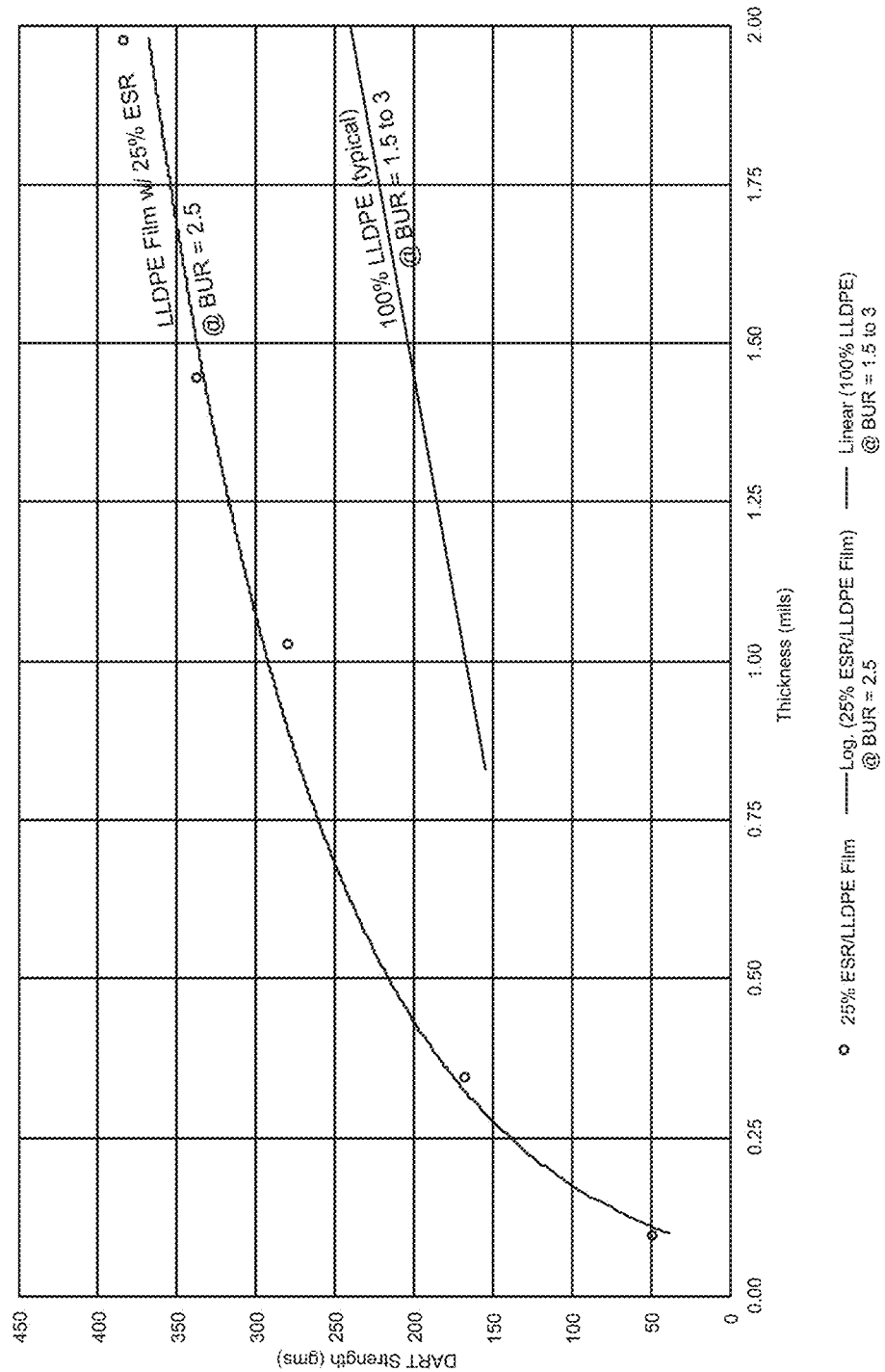
FIG. 4 shows dart strength for films formed from a blend including 25% NuPlastiQ material with the balance being a compatibilizer and polyethylene at a blow up ratio of 2.5, as compared to dart strength for films of polyethylene alone, which polyethylene films do not exhibit strength dependency on blow-up ratio.

FIG. 4 shows additional comparative dart impact strength data for 100% polyethylene films at various film thicknesses, as compared to films formed from a blend of polyethylene and 25% NuPlastiQ renewable carbohydrate-based polymeric material, e.g., at a blow up ratio of about 2.5. FIG. 4 shows the ability to produce a film having a thickness of as little as 0.1 mil. There may be considerable difficulty forming such a thin film from the polyethylene material alone. As indicated by FIG. 4, the strength of the 100% polyethylene film is substantially independent of blow up ratio (i.e., strength is substantially the same at a blow up ratio of 1.5, or at a blow up ratio of 2.0, or 2.5, or 3.0). At all points, the strength of the films formed from the 25% NuPlastiQ renewable carbohydrate-based polymeric material blend are greater than those of the film formed from polyethylene (e.g., LLDPE) alone.

IV. Conclusion

In closing, it is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein. Accordingly, the inventive features are not limited to that precisely as shown and described.

The invention claimed is:

1. A method for providing increased strength to a blown plastic film, the method comprising:
blowing a plastic film with a film blowing apparatus, the film being blown from a blend including a first polymeric material and a renewable starch-based polymeric material, wherein the renewable starch-based polymeric material is (i) substantially amorphous, having a crystallinity of no more than 20%, (ii) has a Young's modulus of at least 1.0 GPa, and/or (iii) has a glass transition temperature of 70° C. to 100° C.;
wherein:
(A) the film blowing apparatus operates at a high blow-up ratio of at least 2.0 when blowing the plastic film, wherein the high blow-up ratio at least assists in providing the blown plastic film with increased strength; and/or
(B) a die gap of the film blowing apparatus is selected so as to be a narrow die gap of no more than 500 microns, wherein the narrow die gap at least assists in providing the blown plastic film with increased strength;
wherein the renewable starch-based polymeric material has a density greater than 1.25 g/cm$^3$.

2. The method of claim 1, wherein the first polymeric material comprises a polyolefin.

3. The method of claim 1, wherein the first polymeric material comprises one or more of polyethylene, polypropylene, polyethylene terephthalate, or a polyester.

4. The method of claim 1, wherein the first polymeric material comprises one or more of polystyrene, ABS, nylon, polyvinyl chloride, or polycarbonate.

5. The method of claim 1, wherein the first polymeric material comprises at least one of polyethylene or polypropylene.

6. The method of claim 1, wherein the first polymeric material comprises LLDPE.

7. The method of claim 1, wherein the blown plastic film has a thickness of from 0.1 mil to 10 mils.

8. The method of claim 1, wherein the blow up ratio is from 2.2 to 2.8.

9. The method of claim 1, wherein the blow up ratio is about 2.5.

10. The method of claim 1, wherein the renewable starch-based polymeric material is formed from a blend of at least two different starches.

11. A method for increasing strength of a blown plastic film, by manipulating a blow up ratio, the method comprising:
blowing a plastic film with a film blowing apparatus, the film being blown from a blend including a first polymeric material and a second polymeric material that comprises a renewable starch-based polymeric material, wherein the renewable starch-based polymeric material is (i) substantially amorphous, having a crystallinity of no more than 20%, (ii) has a Young's modulus of at least 1.0 GPa, and (iii) has a glass transition temperature of 70° C. to 100° C.;
manipulating a blow up ratio of the film blowing apparatus so as to select a high blow up ratio of at least 2.0, the high blow up ratio increasing the strength of the blown plastic film;
wherein the renewable starch-based polymeric material has a density greater than 1.25 g/cm$^3$.

12. The method of claim 11, wherein the strength is increased by at least 1% by selecting the high blow up ratio.

13. The method of claim 11, wherein the strength is increased by at least 10% by selecting the high blow up ratio.

14. The method of claim 11, wherein the blow up ratio is from 2.2 to 2.8.

15. The method of claim 11, wherein the blown plastic film has a thickness of from 0.1 mil to 10 mils.

16. A method for increasing a strength of a blown plastic film by manipulating blow up ratio and die gap, the method comprising:
blowing a plastic film with a film blowing apparatus, the film being blown from a blend including a first polymeric material and a second polymeric material that comprises a renewable starch-based polymeric material, wherein the renewable starch-based polymeric material is (i) substantially amorphous, having a crystallinity of no more than 20%, (ii) has a Young's modulus of at least 1.0 GPa, and/or (iii) has a glass transition temperature of 70° C. to 100° C.;
manipulating a die gap of the film blowing apparatus so as to select a narrow die gap of no more than 500 microns; and
manipulating the blow-up ratio to be at a value of at least 2.0 when blowing the plastic film, wherein the high blow-up ratio and/or narrow die gap at least assist in providing the blown plastic film with increased strength.

17. The method of claim 16, wherein the blow up ratio is from 2.2 to 2.8.

18. The method of claim 16, wherein the die gap is from 250 microns to 500 microns.

19. The method of claim 16, wherein the blown plastic film has a thickness of from 0.1 mil to 10 mils.

20. The method of claim 16, wherein the renewable starch-based polymeric material has a density greater than 1.25 g/cm$^3$.

* * * * *